US007699912B2

(12) United States Patent
Uemura et al.

(10) Patent No.: US 7,699,912 B2
(45) Date of Patent: Apr. 20, 2010

(54) AIR-CLEANER

(75) Inventors: Soichi Uemura, Hamamatsu (JP); Wataru Sugimoto, Hamamatsu (JP); Osamu Kaneko, Hamamatsu (JP); Tetsuo Akiyama, Hamamatsu (JP); Atsushi Suzuki, Hamamatsu (JP)

(73) Assignee: Toyo Roki Seizo Kabushiki Kaisha, Hamamatsu-shi (JP)

(*) Notice: Subject to any disclaimer, the term of this patent is extended or adjusted under 35 U.S.C. 154(b) by 255 days.

(21) Appl. No.: 11/834,723

(22) Filed: Aug. 7, 2007

(65) Prior Publication Data

US 2008/0034974 A1 Feb. 14, 2008

(30) Foreign Application Priority Data

Aug. 9, 2006 (JP) ............................ 2006-217074

(51) Int. Cl.
*B01D 53/04* (2006.01)
*F02M 35/024* (2006.01)

(52) U.S. Cl. ......................... 96/134; 55/385.3; 55/501; 55/503; 55/508; 55/511

(58) Field of Classification Search ........... 96/134–136, 96/147; 55/385.3, 490, 495, 503, 508, 511, 55/501
See application file for complete search history.

(56) References Cited

U.S. PATENT DOCUMENTS

| | | | | |
|---|---|---|---|---|
| 3,678,663 A * | 7/1972 | Hansen | 96/141 |
| 4,418,662 A * | 12/1983 | Engler et al. | 96/133 |
| 5,879,423 A * | 3/1999 | Luka et al. | 55/482 |
| 6,464,761 B1 * | 10/2002 | Bugli | 96/135 |
| 6,592,655 B2 | 7/2003 | Iriyama et al. | |
| 6,692,555 B2 | 2/2004 | Oda et al. | |
| 6,736,871 B1 * | 5/2004 | Green et al. | 55/385.3 |
| 6,890,366 B2 * | 5/2005 | Bugli et al. | 55/385.3 |
| 7,156,891 B2 * | 1/2007 | Winters et al. | 55/497 |
| 7,360,530 B2 * | 4/2008 | Oda et al. | 123/518 |
| 7,476,268 B2 * | 1/2009 | Maier et al. | 96/134 |
| 2002/0124733 A1 * | 9/2002 | Iriyama et al. | 96/134 |
| 2002/0129711 A1 | 9/2002 | Oda et al. | |
| 2005/0279210 A1 * | 12/2005 | Hirata | 96/138 |
| 2007/0022880 A1 * | 2/2007 | Mizutani et al. | 96/136 |

FOREIGN PATENT DOCUMENTS

| | | |
|---|---|---|
| JP | 2002-266713 | 9/2002 |
| JP | 2002-276486 | 9/2002 |
| JP | 2003-042017 A * | 2/2003 |

* cited by examiner

*Primary Examiner*—Frank M Lawrence
(74) *Attorney, Agent, or Firm*—Young & Thompson

(57) ABSTRACT

The air-cleaner includes a housing. The air-cleaner includes a filter element located in the housing to filter air taken into the housing. The air-cleaner includes an adsorption element for adsorbing vaporized fuel flowing into the housing. The housing includes first and second housing components having open ends put on each other. The filter element is held between the first and second housing components, separating the housing into a clean side and a dust side. The adsorption element includes a frame at the periphery; and an adsorption portion located inside the frame. One of the first and second housing components as the clean side has an inner side back in the open end, the inner side having a mounting portion having the adsorption element mounted thereto. The mounting portion includes the adsorption element; and a support member placed thereon.

5 Claims, 5 Drawing Sheets

AIR-CLEANER

CROSS-REFERENCE TO RELATED APPLICATIONS

This application is based upon and claims the benefit of priority from Japanese Patent Application No. 2006-217074 filed on Aug. 9, 2006; the entire contents of which are incorporated herein by reference.

BACKGROUND OF THE INVENTION

The invention relates to an air-cleaner installed in the intake system of an internal combustion engine, filtering an intake air, and feeding the filtered air to the engine.

Recent internal combustion engines are further required to prevent leakage of a vaporized fuel from the intake system. Consequently, a technique is spread, which provides an adsorbent adsorbing the vaporized fuel in an air-cleaner installed in the intake system. For example, Japanese Patent Application Laid-Open No. 2002-266713 (referred to as Patent Publication 1) discloses the following air-cleaner. The air-cleaner includes therein an adsorption sheet opposed to a filter element for adsorbing a vaporized fuel, being positioned on a clean side within the housing of the air-cleaner.

Japanese Patent Application Laid-Open No. 2002-276486 discloses an invention related to adsorption means (referred to as Patent Publication 2). The adsorption means disclosed therein is formed by holding granular activated carbon between unwoven fabrics, and integrally putting heat resistant nets on the respective unwoven fabrics. The adsorption means is also arranged to be opposed to a filter element on the clean side in the air-cleaner.

As disclosed in the above patent publications, for preventing the vaporized fuel from leaking from the intake system to the atmosphere, the techniques for adsorbing the vaporized fuel using the air-cleaners have been recently performed.

However, the air-cleaner is a unit mainly intended to filter the intake air and feed the filtered air to the engine. Therefore, while the engine is operated, an intake action produces an air-flow directed from the dust side to the clean side within the air-cleaner.

According to the invention disclosed in the Patent publication 1, the adsorption sheet receives the intake air to be flexible downstream due to the air pressure. If the adsorption sheet is thickened to prevent such a flexing phenomenon, the air-flow resistance is increased.

Furthermore, according to the invention disclosed in the Patent Publication 2, it is disadvantageously difficult to form such different types of materials as the granular activated carbon, the nonwoven fabrics, and the heat resistant nets into an integrated member. Holding of the granular activated carbon between the paired heat resistant nets eventually increases air-low resistance.

SUMMARY OF THE INVENTION

It is an object of the invention to provide an air-cleaner which prevents an adsorbent from being flexed while suppressing an increase in air-flow resistance, and which securely adsorbs a vaporized fuel.

The feature of the invention provides the following air-cleaner. The air-cleaner includes a housing. The air-cleaner includes a filter element located in the housing to filter an air taken into the housing. The air-cleaner includes an adsorption element for adsorbing a vaporized fuel flowing into the housing. The housing includes first and second housing components having open ends put on each other. The filter element is held between the first and second housing components, separating the housing into a clean side and a dust side. The adsorption element includes a frame at the periphery; and an adsorption portion located inside of the frame. One housing component of the first and second housing components as the clean side has an inner side back in the open end, the inner side having a mounting portion having the adsorption element mounted thereto. The mounting portion includes the adsorption element; and a support member put on the adsorption element and supporting the adsorption portion. The support member is located back in said one housing component for fixing.

Said one housing component as the clean side may have an open end having a flange projecting outwardly. The flange may have a two-step structure projecting as a stairway. The two-step structure may include an outer step as a fitting portion having the filter element fitted thereto. The two-step structure may include an inner step as the mounting portion.

The adsorption element and the support member may be vibration welded to the mounting portion, being formed integrally with each other.

The mounting portion and the frame of the adsorption element may have weld-projections projecting toward and abutting against each other, respectively. The support member may be located inside of a weld-projection formed to the mounting portion. The support member may have a periphery having a weld-projection projecting toward and abutting against the weld-projection of the frame of the adsorption element. One of the mounting portion and the frame may have a first wall projecting toward the other one of the mounting portion and the frame. The first wall may be located outside of the weld-projections and parallel to the weld-projections. One of the support member and the frame may have a second wall extending toward the other one of the support member and the frame. The second wall may be located inside of the weld-projections and parallel to the weld-projections.

The periphery of the frame of the adsorption element and the periphery of the support member may have through-holes positioned coinciding with each other.

The mounting portion may have a projecting pin. The pin may pass through the through-holes, fixing the adsorption element and the support member to the mounting portion. The pin may include a head projecting from the through-holes. The head may be crashed and functions as a stopper to prevent the pin from coming out of the adsorption element and the support member.

DESCRIPTION OF THE PREFERRED EMBODIMENTS

Embodiments of the invention will be described below with reference to the accompanying drawings.

First Embodiment

Figure 1:
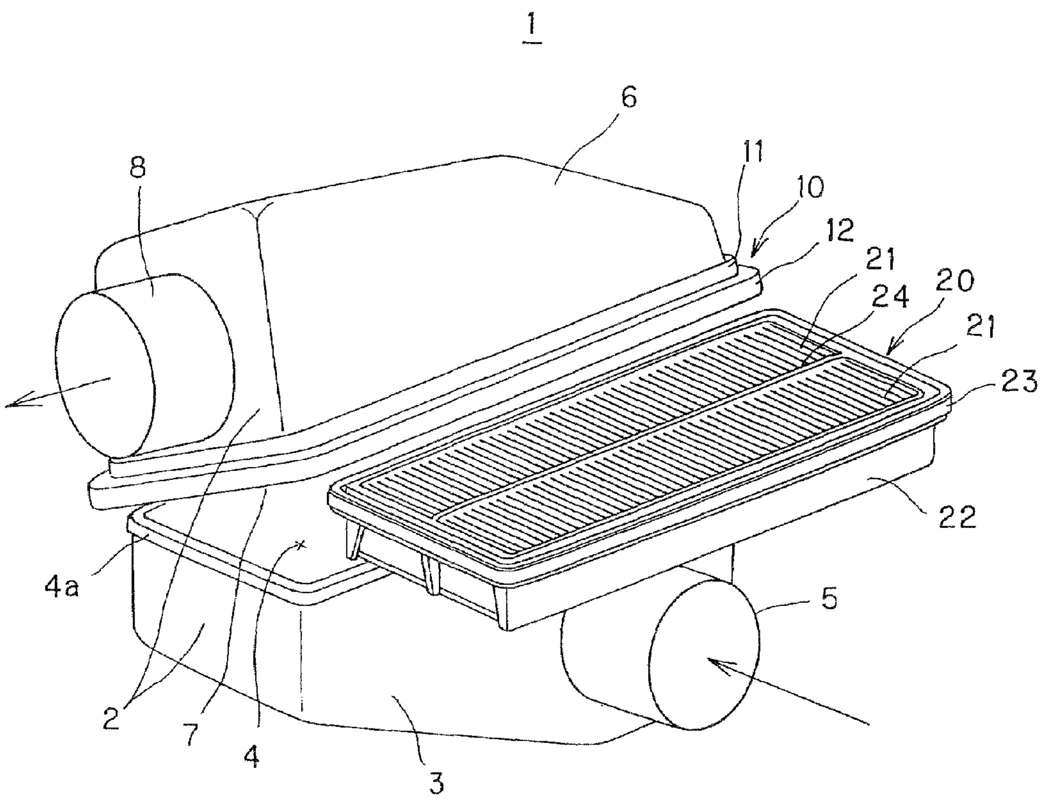
FIG. 1 is a perspective view of an air-cleaner according to the first embodiment of the invention.

With reference to FIG. 1, an air-cleaner 1 is installed in the intake system of an internal combustion engine, filtering an intake air to be fed to the engine. The air-cleaner 1 includes a housing 2 serving as the outer envelope of the air-cleaner 1. The air-cleaner 1 also includes a filter element 10 located in the housing 2 for filtering the intake air. The air-cleaner 1 further includes an adsorption element 30 adsorbing a vaporized fuel flowing in the housing 2.

The housing 2 is constituted with a pair of housing components 3 and 6 as first and second housing component. The housing component 3 is a casing 3 serving as the lower portion of the housing 2. The other housing component 6 is a cover 6 serving as the upper portion of the housing 2. The casing 3 has four sides on the periphery and a closed bottom. The upper end of the casing 3 is formed as an open end 4. The open end 4 has a flange 4*a* projecting outward of the casing 3 on the peripheral edge. The cover 6 has four sides on the periphery and the upper portion is closed by the top surface. The lower end of the cover 6 is formed as an open end 7. The open ends 4 and 7 of the respective casing 3 and cover 6 are fitted on each other, thereby forming the box-shaped housing 2. The open ends 4 and 7 of the respective casing 3 and cover 6 are engageable with and disengageable from each other. FIG. 1 illustrates the air-cleaner 1 having the casing 3 and the cover 6 removed from each other and having the filer element 20 taken out of the inside.

One of the sides of the casing 3 has a cylindrical inlet 8 extending outward. The inlet 8 allows the air taken into the intake system from the atmosphere to flow into the housing 2. One of the sides of the cover 6 has a cylindrical outlet 8 extending outward. The outlet 8 is connected to a path connecting to the engine, feeding the air filtered by the air-cleaner 1 to the engine.

The filter element 20 mounted in the housing 2 includes a filtering member 21 folded into continuous peaks and troughs. The filter element 20 also includes a holding frame 22 arranged around the filtering member 21 and holding the filtering member 21. The filter element 20 further includes a packing 23 fitted to the entire periphery on the outer surface of the holding frame 22. While the filter element 20 including a rib 24 that is provided at the center of the holding frame 22 is illustrated in FIG. 1 by way of example, the filter element 20 without the rib 24 may be employed.

The filter element 20 is held between the casing 3 and the cover 6 and fitted in the housing 2. The filter element 20 separates the interior of the housing 2 into a dust side as an atmospheric side and a clean side as an engine side. The air-cleaner 1 according to the first embodiment includes the dust side corresponding to a side of the casing 3 relative to the filter element 20, and the clean side corresponding to a side of the cover 6 relative to the filter element 20.

Figure 2:
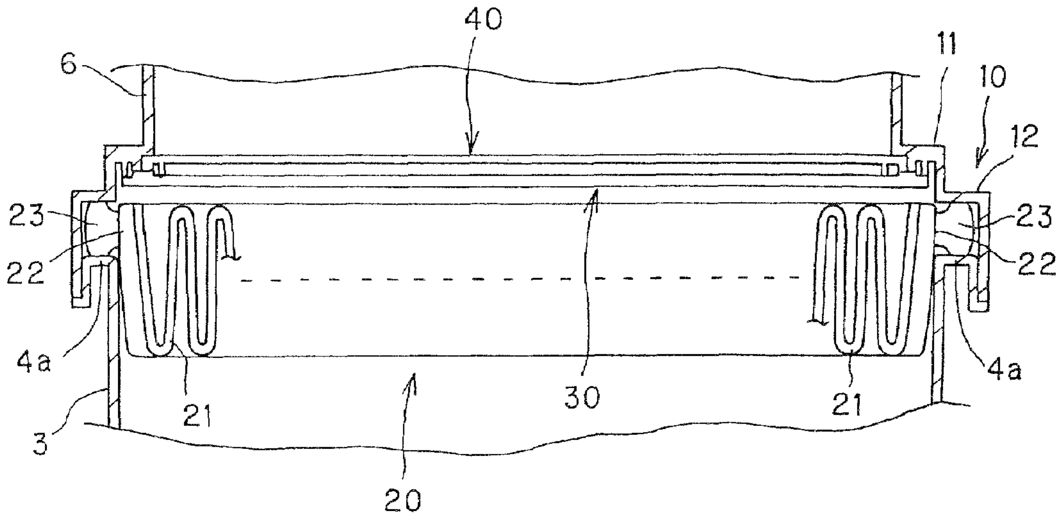
FIG. 2 is a cross-sectional view illustrating the internal structure of a portion of fitting a casing and a cover fitted thereto.

With reference FIG. 2, the air-cleaner 1 includes a flange 10 formed on the open end 7 of the cover 6 serving as the clean side. The flange 10 projects outwardly as a stepway, being formed in two steps. The two steps include a first step formed inside and back of the cover 6. As will be described later, the first step serves as a mounting portion 11 having the adsorption element 30 mounted thereto. The two steps include a second step formed outside and on the end side of the cover 6. The second step serves as a fitting portion 12 having the filter element 20 fitted thereto.

As illustrated in FIG. 2, the holding frame 22 of the filter element 20 is located below the second step. The packing 23 on the outer periphery of the filter element 20 is held between the second step and the flange 4*a* formed on the open end 4 of the casing 3. In this way, the packing 23 attached to the holding frame 22 is held between the second step and the flange 4*a* of the casing 3 for sealing. The above-mentioned structure hermetically closes a portion having the casing 3 and the cover 6 fitted to each other.

Figure 3:
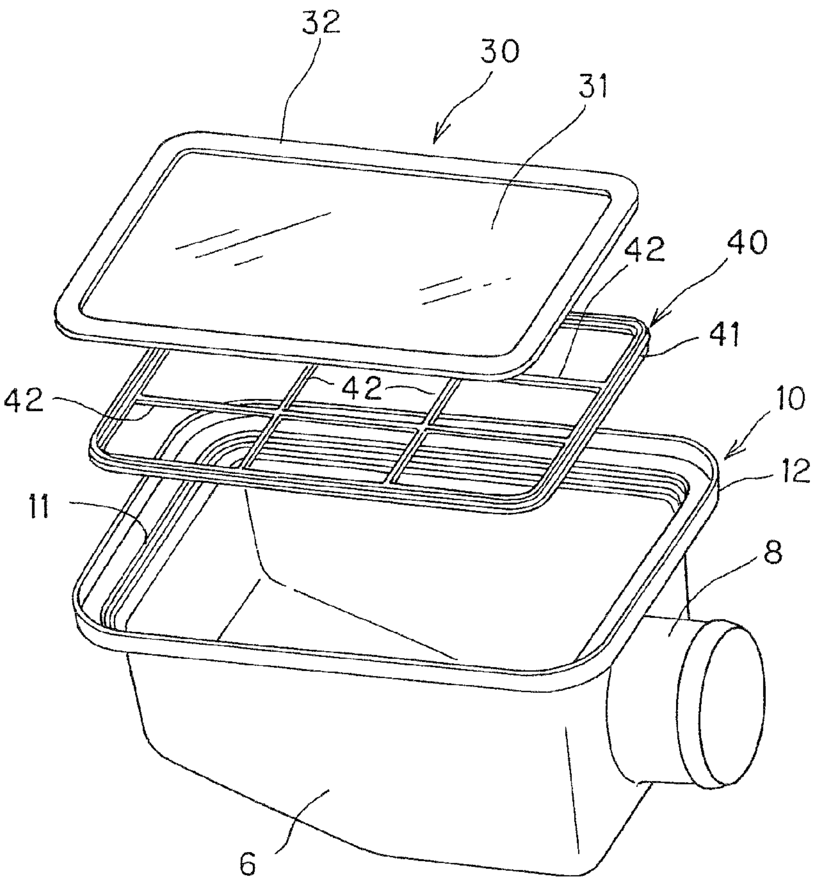
FIG. 3 is a perspective view of the cover, a support member, and an adsorption element in the air-cleaner illustrated in FIG. 1.

FIG. 3 illustrates the adsorption element 30 and a support member 40 attached to the cover 6.

The plate-like adsorption element 30 includes an adsorption portion 31 containing, for example, activated carbon. The adsorption element 30 also includes a frame 32 arranged on the periphery of the adsorption element 30 and holding the adsorption portion 31. The adsorption portion 31 is structured, for example, so that activated carbon powder is impregnated into a nonwoven fabric or held between a pair of nonwoven fabrics. The frame 32 holding the adsorption portion 31 is made of a resin. The support member 40 is a molded component made of a resin.

The support member 40 includes a frame 41 formed to be slightly smaller in outer edge than the frame 32 of the adsorption element 30. The support member 40 includes ribs 42 extending longitudinally and transversely in the frame 41. The support member 40 is put on the adsorption element 30, whereby the support member 40 prevents the adsorption portion 31 of the adsorption element 30 from being flexed. Namely, the frame 41 serving as the peripheral edge of the support member 40 coincides with the frame 32 of the adsorption element 30. The ribs 42 arranged inside of the frame 41 are put on the adsorption element 30 along the adsorption portion 31 of the adsorption element 30. Due to this, even if an external force acts on the adsorption portion 31 of the adsorption element 30, the support member 40 supports the adsorption portion 31, thus preventing the adsorption portion 31 from being flexed toward the support member 40.

Figure 4:
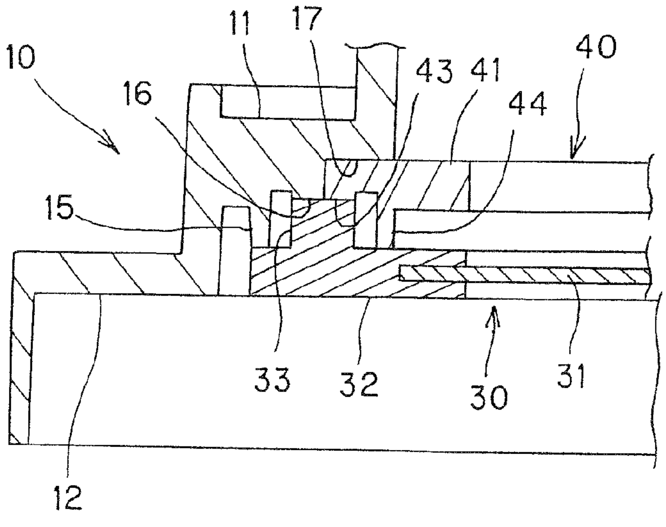
FIG. 4 is an enlarged view of a flange, illustrating an exemplary mounting structure of mounting the adsorption element and the support member to a mounting portion in the air-cleaner illustrated in FIG. 1.

In the air-cleaner 1 according to the first embodiment, the adsorption element 30 and the support member 40 are vibration welded to the mounting portion 11 of the cover 6 as illustrated in FIG. 4.

First, the structure of the mounting portion 11 formed on the flange 10 of the cover 6, that of the frame 32 of the adsorption element 30, and that of the frame 41 of the support member 40 will be described in detail.

As described above, the mounting portion 11 formed on the flange 10 is the first step arranged inside and back of the cover 6. The mounting portion 11 has a weld-projection 16. The weld-projection 16 extends along the entire periphery of the mounting portion 11 and projects from the surface of the first step at the center of the mounting portion 11. The weld-projection 16 has an outer wall 15 formed outside thereof and similarly projecting from the surface of the first step of the mounting portion 11. The outer wall 15 is formed to surround the weld-projection 16 on the entire periphery thereof. The inner region of the weld-projection 16 is a depression 17 formed on the entire periphery of the mounting portion 11. The depression 17 is the region having the frame 41 of the support member 40 fitted therein.

A side of the frame 41 of the support member 40 fitted in the depression 17 is formed flat. The flat side of the frame 41 is fitted in the depression 17. The opposite side of the frame 41 includes a weld-projection 43 projecting toward the open end 7 of the cover 6 and an inner wall 44. The weld-projection 43 is formed on the entire periphery of the frame 41 along the outer edge of the frame 41. When the frame 41 is fitted into the depression 17, the weld-projection 43 comes adjacent to the weld-projection 16 formed on the mounting portion 11 of the cover 6. The ends of the weld-projections 43 and 16 are directed toward the open end 7 of the cover 6. The inner wall 44 projects from the opposite side of the frame 41 inside the weld-projection 43 with a predetermined clearance formed between the inner wall 44 and the weld-projection 43. Similarly to the weld-projection 43, the inner wall 44 is formed on the entire periphery of the frame 41.

The frame 32 of the adsorption element 30, by contrast, includes a flat side directed to the open end 7 of the cover 6. The frame 32 has an opposite side directed toward the interior of the cover 6. The opposite side of the frame 32 has a weld-projection 33. The weld-projection 33 projects from the opposite side of the frame 32 toward the interior of the cover 6 slightly inside of the outer edge of the frame 32. Similarly to the weld-projection 43 of the support member 40 and the weld-projection 16 of the mounting portion 11, the weld-projection 33 is formed on the entire periphery of the frame 32. The thickness of the weld-projection 33 substantially coincides with the sum of the thickness of the weld-projection 43 of the support member 40 and that of the weld-projection 16 of the mounting portion 11.

The mounting portion 11 of the cover 6, the frame 41 of the support member 40, and the adsorption element 30 are formed integrally with one another. Namely, the weld-projection 16 of the mounting portion 11 and the weld-projection 43 of the support member 40 are abutted against and vibration welded to the weld-projection 33 of the adsorption element 30, thereby welding the mounting portion 11, the frame 41, and the adsorption element 30 to one another. The vibration welding allows the end of the outer wall 15 projecting from the mounting portion 11 of the cover 6 to be closely attached to the frame 32 of the adsorption element 30. Therefore, the outer wall 15 partitions off the outside from the inside thereof and forms a hermetically-sealed space between the outer wall 15 and the weld-projections 16 and 33 over the entire periphery of the outer wall 15. Likewise, the vibration welding allows the end of the inner wall 44 projecting from the frame 41 of the support member 40 to be closely attached to the frame 32 of the adsorption element 30. Therefore, the inner wall 44 partitions off the outside from the inside thereof, forming a hermetically-closed space between the inner wall 44 and the weld-projections 33 and 43 over the entire periphery of the inner wall 44.

Both of the outer wall 15 and the inner wall 44 function as a burr concealment. Namely, the vibration welding causes burrs from the weld-projections 16, 33, and 43, with the abutted weld-projections 16, 33, and 43 slid each other. If the burrs are scattered inside of the air-cleaner 1, they can possibly cause damage and clogging of the filter element 20 or other failures. If the burrs are scattered outside of the outer wall 15, they can possibly damage the packing 23 of the filter element 20 fitted to the first step.

However, in the air-cleaner 1 according to the first embodiment, the outer wall 15 and the inner wall 44 function as a burr concealment. Therefore, the produced burrs remain in the hermetically-closed space between the outer wall 15 and the weld-projections 16 and 33 and that between the inner wall 44 and the weld-projections 33 and 43, thus securely preventing the burrs from being scattered.

Figure 5:
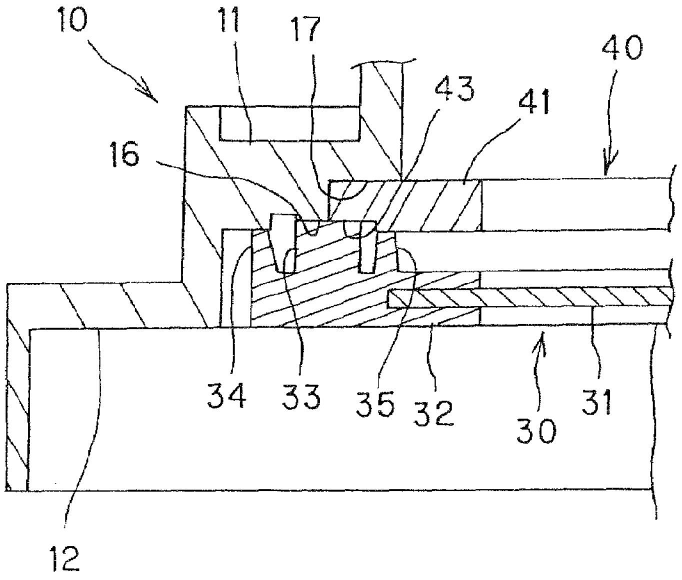
FIG. 5 is an enlarged view of a flange, illustrating another exemplary mounting structure different from that illustrated in FIG. 4.
Figure 6:
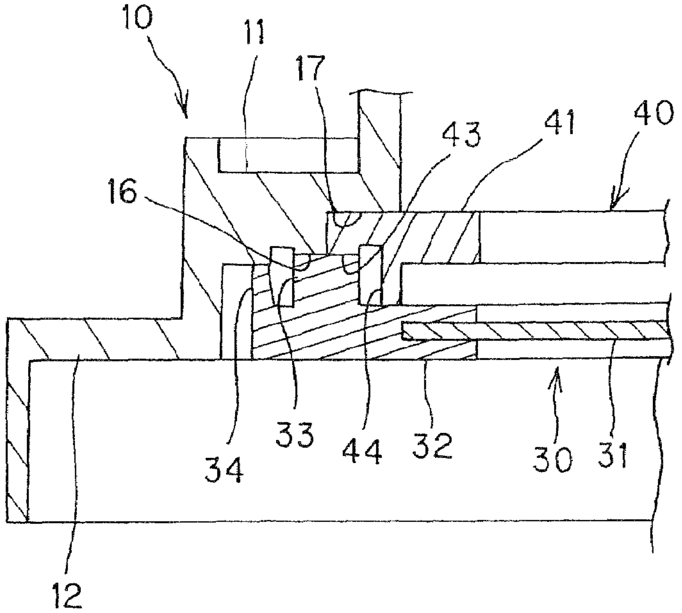
FIG. 6 is an enlarged view of a flange, illustrating further another exemplary mounting structure in the air-cleaner illustrated in FIG. 1.

The instance of forming the outer wall 15 on the mounting portion 11 of the cover and forming the inner wall 44 on the frame 41 of the support member 40 has been described while referring to FIG. 4. However, the first embodiment is not limited to the instance. As illustrated in FIG. 5, for example, both an outer wall 34 and an inner wall 35 may be formed on the frame 32 of the adsorption element 30. Alternatively, as illustrated in FIG. 6, the outer wall 34 may be formed on the frame 32 of the adsorption element 30. The inner wall 44 may be formed on the frame 41 of the support member 40. Although not illustrated in the drawings, the outer wall may be formed on the mounting portion 11 of the cover 6. The inner wall may be formed on the frame 32 of the adsorption element 30.

Second Embodiment

Figure 7:
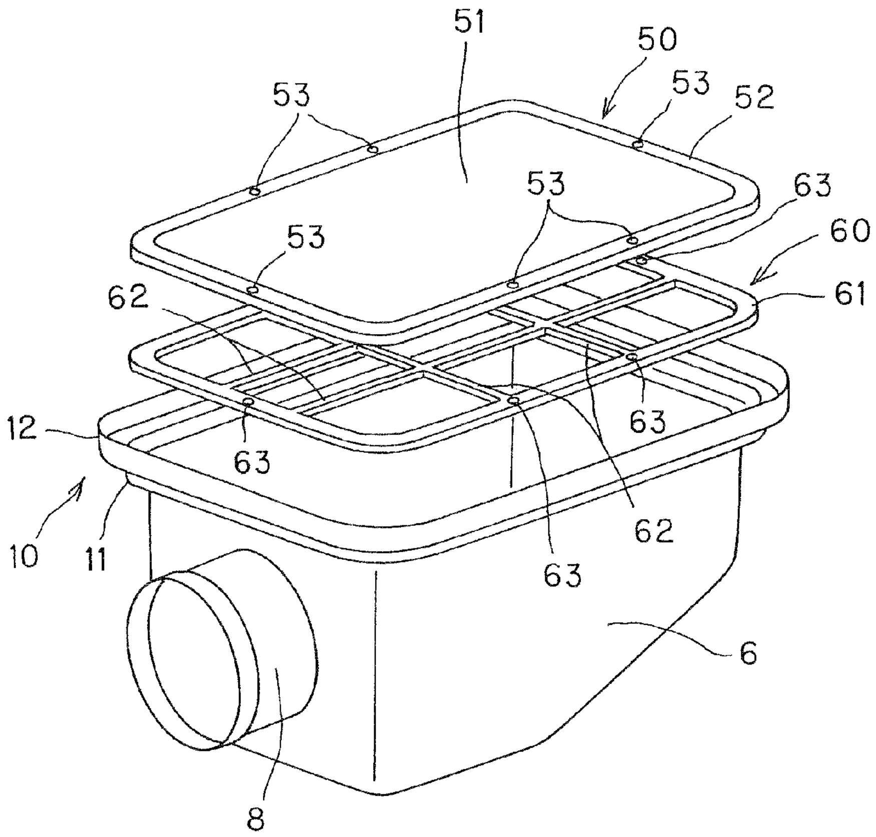
FIG. 7 is a perspective view of the cover, the support member, and the adsorption element of an air-cleaner according to the second embodiment of the invention.

FIG. 7 is a perspective view of a cover 6 serving as a clean side of an air-cleaner 1 according to the second embodiment of the invention. Similarly to the first embodiment, an adsorption element 50 and a support member 60 are mounted in the cover 6. FIG. 7 illustrates a structure of the cover 6 before the adsorption element 50 and the support member 60 are mounted integrally in the cover 6.

The plate-like adsorption element 50 includes an adsorption portion 51 and a frame 52 holding the circumference of the adsorption portion 51. The adsorption element 50 includes through-holes 53 passing through the frame 52 in a thickness direction of the frame 52. The support member 60 includes a frame 61 slightly smaller in peripheral edge than the frame 52 of the adsorption element 50. The support member 60 includes ribs 62 arranged transversely in the frame 61. The frame 61 of the support member 60 includes through-holes 63 extending through the frame 61 in a thickness direction of the frame 61.

The through-holes 53 of the frame 52 of the adsorption element 50 and the through-holes 63 of the frame 61 of the support member 60 are positioned coinciding with one another in the peripheral directions of the frames 52 and 61. Therefore, when the support member 60 is put on the adsorption element 50, the through-holes 53 and 63 communicate with one another at respective positions.

In the second embodiment, similarly to the first embodiment, the cover 6 serving as the clean side includes the flange 10 of a two-step structure on the open end. Two steps include a first step formed inside and back of the cover 6. The first step serves as the mounting portion 11 having the adsorption element 50 mounted thereto. The two steps include a second step formed outside on the end side. The second step serves as the fitting portion 12 of a filter element.

The second step has a frame of the filter element (not illustrated) located thereon. The second step and a casing (not illustrated) hold therebetween a packing (not illustrated) on the outer periphery of the frame constituting the filter element. The air-cleaner 1 according to the second embodiment is similar in this respect to that according to the first embodiment.

Figure 8:
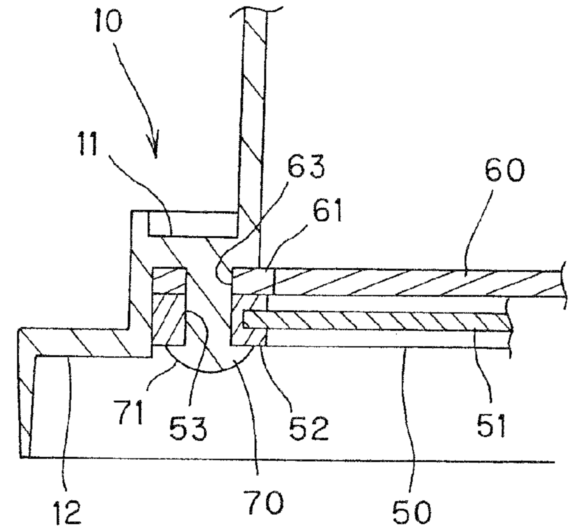
FIG. 8 is an enlarged view of a flange, illustrating an exemplary mounting structure of mounting the adsorption element and the support member to a mounting portion in the air-cleaner illustrated in FIG. 7.

Differently from the first embodiment, as illustrated in FIG. 8, the mounting portion 11 serving as the first step includes pins 70 projecting downward from the surface of the mounting portion 11. The adsorption element 50 and the support member 60 are mounted to the mounting portion 11 by caulking the pins 70.

The pins 70 project from the surface of the mounting portion 11 to the open side of the cover 6 at substantially widthwise central positions of the mounting portion 11. Each of the pins 70 has an axial dimension, which dimension is larger than the sum of a thickness of the frame 52 of the adsorption element 50 and that of the frame 61 of the support member 60.

Figure 9:
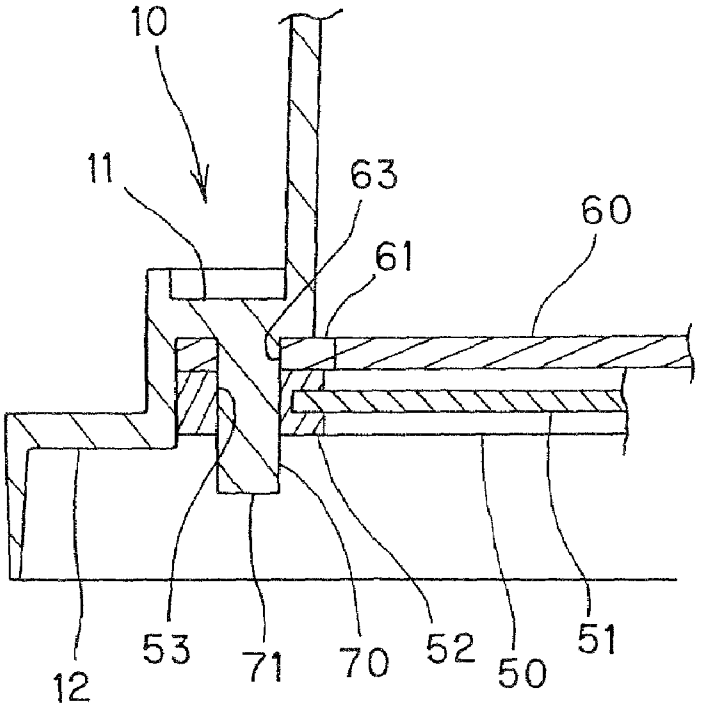
FIG. 9 is an enlarged view of the flange before the adsorption element and the support member are fixed to the cover in the air-cleaner illustrated in FIG. 7.

The cover 6, the adsorption element 50, and the support member 60 are formed integrally with one another as follows. First, as shown in FIG. 9, the support member 60 is put on the adsorption element 50. The pins 70 formed on the mounting portion 11 are inserted into the through-holes 53 and 63. At this time, the support member 60 is arranged back in the cover 6 and the adsorption element 50 is arranged on the open side of the cover 6. Heads 71 of the pins 70 inserted into the respective through-holes 53 and 63 project from the frame 52 of the adsorption element 50 in an arrangement of the adsorption element 50 and the support member 60 put on the adsorption element 50.

Next, as illustrated in FIG. 8, the heads 71 of the projecting pins 70 are crushed, thereby fixing the adsorption element 50 and the support member 60 to each other. The crushed heads 71 of the pins 70 are widened outward in a radial direction, with the surfaces of the heads 71 formed into spherical shapes. The heads 71 widened outward function as a stopper, preventing the pins 70 from coming out of the adsorption element 50, in which the pins 70 are inserted into the through-holes 53 and 63, and the support member 60. To crush the heads 71 of the pins 70, the heads 71 may be subjected to ultrasonic heating in a similar manner to ultrasonic welding. As can be understood, in the air-cleaner 1 according to the second embodiment, the adsorption element 50 and the support member 60 are mounted to the cover 6 so as to be integrated with one another.

The second embodiment has been described while referring to the instance of the air-cleaner 1 configured so that the casing serves as a dust side and so that the cover 6 serves as the clean side. However, the second embodiment is not limited to the instance. The casing may be constituted as the clean side and the cover may be constituted as the dust side. In this case, the adsorption element is fixed to the casing. Namely, the invention is intended to effectively adsorb the vaporized fuel flowing into the housing of the air-cleaner. Therefore, it suffices to fix the adsorption element to the housing component serving as the clean side of the housing.

Needless to say, a putting order of the adsorption element and the support member is such that the support member is located back in the housing component so as to be located downstream of the intake air relative to the adsorption element. This location prevents the adsorption portion of the adsorption element from being flexed downstream of the air.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, the support member supports the adsorption element downstream of the intake system, preventing an air-flow produced in the air-cleaner during air intake from flexing the adsorption portion downstream. Consequently, the adsorption element is formed thinner, preventing air-flow resistance from increasing during air intake. Said one housing component is provided with the mounting portion, and the adsorption element and the support member are put on each other, being fixed to the mounting portion, not causing interference with the air-flow.

With the vibration welding adopted as a fixing method, the weld-projection has the first and second walls inside and outside thereof. The first and second walls function as a burr concealment preventing burrs caused by the vibration welding from being scattered. Caulking of a pin may be adopted as a fixing method. This method allows the adsorption element and the support member to be securely fixed to a housing component using simple fabrication steps.

With either of the fixing methods adopted, removing of the adsorption element fixed to the housing is required to destroy the mounting portion, which responds to a request that the adsorption element has a structure not to be removed from the housing.

What is claimed is:

1. An air-cleaner, comprising:
- a housing;
- a filter element located in the housing to filter an air taken into the housing; and
- an adsorption element for adsorbing a vaporized fuel flowing into the housing, wherein the housing includes first and second housing components having open ends put on each other, wherein the filter element is held between the first and second housing components, separating the housing into a clean side and a dust side,
- wherein the adsorption element includes a frame at the periphery and an adsorption portion located inside of the frame, wherein one housing component of the first and second housing component as the clean side has an inner surface recessed in the open end, the inner surface having a mounting portion having the adsorption element mounted thereto, and wherein the mounting portion includes the adsorption element; and
- a support member put on the adsorption element and supporting the adsorption portion, wherein the support member is located and recessed in said one housing component for fixing,
- wherein the support member includes a frame coinciding with the frame of the adsorption element, and ribs extending longitudinally and transversely inside of the frame of the support member and coinciding with the adsorption portion.

2. The air-cleaner according to claim 1, wherein said one housing component as the clean side has an open end having a flange projecting outwardly, wherein the flange has a two-step structure projecting as a stairway, wherein the two-step structure includes an outer step as a fitting portion having the filter element fitted thereto, wherein the two-step structure includes an inner step as the mounting portion.

3. The air-cleaner according to claim 2, wherein the adsorption element and the support member are vibration welded to the mounting portion, being formed integrally with each other.

4. The air-cleaner according to claim 3, wherein the mounting portion and the frame of the adsorption element have weld-projections projecting toward and abutting against each other, respectively, wherein the support member is located inside of a weld-projection formed to the mounting portion, wherein the frame of the support member has a weld-projection projecting toward and abutting against the weld-projection of the frame of the adsorption element, wherein one of the mounting portion and the frame of the adsorption element has a first wall projecting toward the other one of the mounting portion and the frame of the adsorption element, wherein the first wall is located outside of the weld-projections and parallel to the weld-projections, wherein one of the support member and the frame of the adsorption element has a second wall extending toward the other one of the support member and the frame of the adsorption element, and wherein the second wall is located inside of the weld-projections and parallel to the weld-projections.

5. The air-cleaner according to claim 2, wherein the frame of the adsorption element and the frame of the support member have through-holes positioned coinciding with each other, wherein the mounting portion has a projecting pin, wherein the pin passes through the through-holes, fixing the adsorption element and the support member to the mounting portion, wherein the pin includes a head projecting from the through-holes, and wherein the head is crushed and functions as a stopper to prevent the pin from coming out of the adsorption element and the support member.

* * * * *